June 16, 1931.  H. MacELHONE  1,810,837
METHOD OF APPLYING TEMPORARY WRAPPERS
Filed April 6, 1931
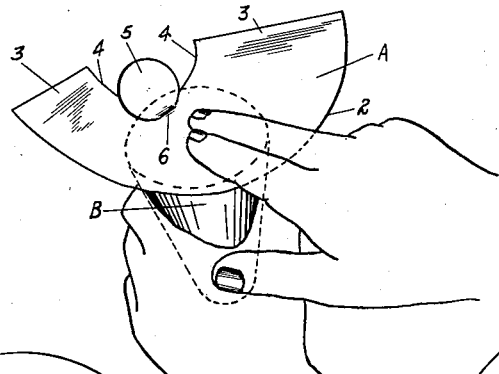
Fig.2.
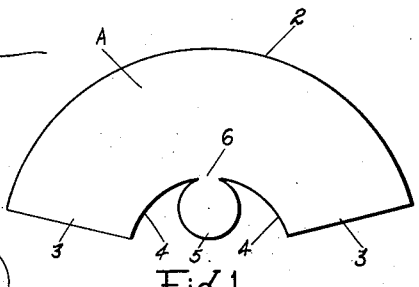
Fig.1.
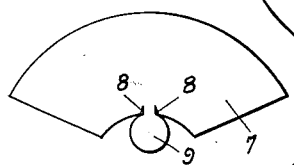
Fig.6.
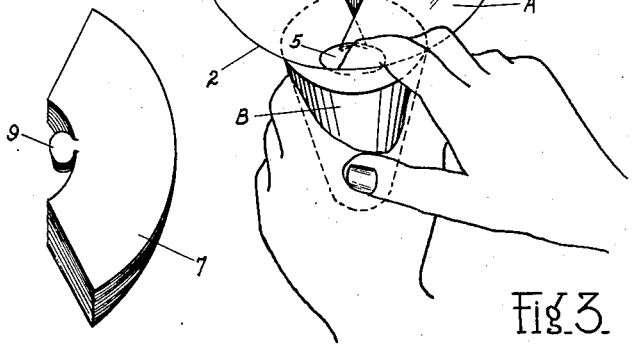
Fig.3.
Fig.7.
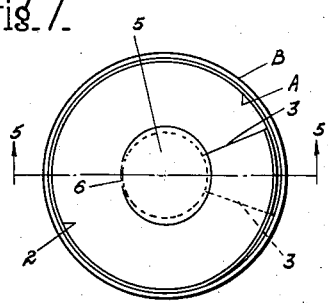
Fig.4.
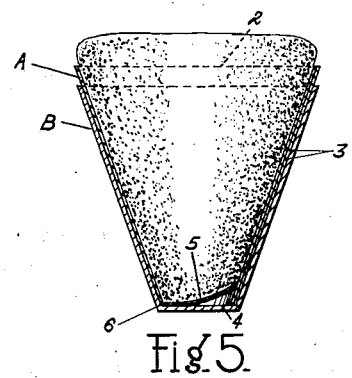
Fig.5.
INVENTOR.
HARRY MacELHONE.
BY
ATTORNEY.

Patented June 16, 1931

1,810,837

UNITED STATES PATENT OFFICE

HARRY MacELHONE, OF BINGHAMTON, NEW YORK

METHOD OF APPLYING TEMPORARY WRAPPERS

Application filed April 6, 1931. Serial No. 528,053.

My invention pertains to an improvement in blanks for temporary wrappers for ice cream bodies and more particularly the method of applying the same, and it has for its primary object to provide a blank of paper of suitable form for forming a wrapper for holding ice cream, wherein the blank is so shaped that it may upon insertion into a mould, be formed into an enveloping removable wrapper, conforming to the shape of the mould for the purpose of receiving a confection mixture for freezing, and adapted to be lifted therefrom with the frozen confection and wrapper stripped off and removed, the frozen mass thus being ready for dispensing to the trade. Thus the ice cream or other frozen confection is kept free from dirt and other foreign substances.

Another object of my invention lies in the method of preparing servings of frozen confection with paper wrappers during the freezing step and which wrappers are formed as to shape by inserting the blank forms thereof into the moulds.

With these objects in view of my invention consists of certain novel features of construction and arrangement of parts as will be hereinafter fully described and pointed out in the claim, reference being had to the accompanying drawings, in which, Figure 1 is a plan view of a blank out of which my device is formed.

Figure 2 is a perspective view illustrating the first step of the forming method.

Figure 3 is a similar view showing the position of the wrapper during the forming operation.

Figure 4 is a top plan view of the mould with the wrapper formed therein.

Figure 5 is a cross sectional view of the mould with the wrapper formed therein.

Figure 6 is a plan view of a modified form of blank.

Figure 7 is a view of a stack of blanks ready for use.

The same reference characters denote like parts in each of the several figures of the drawings.

The flat blank which comprises the wrapper is preferably of paper, and is stamped or otherwise cut to a form and shape which, when the blank is pushed into the mould, conforms readily to the shape thereof to form a lining in said mould. The shape of the mould in which the confection is frozen, of course, determines the shape of the paper blank. For illustrative purposes, a conical shaped mould is illustrated, in which ice cream is frozen in proper size and shape for serving in standard ice cream cones. Consequently the blank form for the wrapper is shown in the proper form for such shaped mould. This blank, indicated generally at A has a relatively large semi-circular outer side 2, which as shown includes more than 90 degrees, two ends 3, 3 and the inner sides 4, 4, substantially concentric with the side 2 and centrally of which is a projecting circular bottom section or tab 5, the center portion 6 comprising the integral union of the circular bottom 5 with the main arcuate body, this being the point of alinement of the bottom of the cup shaped wrapper, when the ends 3, 3 are curled into overlapping conical engagement.

The mould B is preferably of metal construction having the substantially conical form and having the outwardly sloping sides and closed bottom. The wrapper A is cut to a size to readily bend or curl to conform to the shape of the interior of the mould B when inserted therein, the bottom 5 automatically closing inside the body of the wrapper as the same is inserted downwardly in the mould. The steps of placing the wrapper A in the mould are shown clearly in Figures 4 to 7. The wrapper in its flat form is laid across the top of the mould and pressed downwardly slightly to first slightly bend the bottom tab 5 so that it will fold inside of the body portion of the wrapper. Continued insertion of the wrapper, as illustrated in Figure 5, results in the body portion thereof curling around upon itself, conforming to the shape of the smooth inner sides of the mould B as it is pressed downwardly therein. When completely inserted, as shown in Figures 6 and 7, the ends 3, 3 of the wrapper overlap slightly and with the bottom section folded therein, forms a paper cup or wrapper inside the mould B.

Thus the wrapper for the frozen confection is formed automatically as it is placed in the mould and because of its blank form permitting this automatic operation, eliminates the necessity of pre-forming the cups or wrappers. This is a considerable saving in expense as it is of course, much less expensive to cut the blanks A in the flat and use them that way directly than to pre-form the wrappers into cup shape before inserting them in the moulds.

The ice cream or other confection mixture to be frozen is then poured into this wrapper within the cup B and during the freezing operation the wrapper adheres to the freezing mass. The wrapped frozen confection can then be lifted out of the metal mould B and a large number of these wrapped bodies of frozen confection can be placed in a large container under freezing temperature, and one or more lifted out from time to time for serving. When delivered to the customer, the paper wrapper A is torn or stripped from the confection as it is placed in the cone or other serving receptacle.

In Figure 6 is shown a modified form of wrapper 7 in which there are provided cuts 8 extending inwardly of the body portion of the wrapper at points where the edges of the bottom tab 9 joins the edge of the body portion. These cuts render the bottom tab more flexible and more readily bendable to a position inside the body portion as the wrapper is inserted in the cup B.

It has been found too by experience that the proper insertion of the wrappers in the cup is facilitated and can be accomplished with a saving of time, if the bottom tabs of the wrappers are bent up slightly, as shown in Figure 7. A stack of blanks are usually placed in a convenient position for use and the tabs of the stack bent up slightly as shown. This feature is, of course, equally as advantageous whether the blanks of the type shown in Figure 1 or those shown in Figure 6 are used.

Of course changes may be made in details of construction and arrangement of parts and the exact steps of the method without departing from the spirit and scope of my invention. I do not limit myself, therefore, other than by the appended claim.

I claim:

A method of the character herein described comprising the steps of placing a substantially flat blank having a substantially arcuate body portion and bottom tab on a rigid mould, and manually pressing the blank into the mould whereby simultaneously to line the bottom and sides of the mould to form a wrapper for material to be placed therein.

In testimony whereof, I affix my signature.

HARRY MacELHONE.